(12) United States Patent
Dennistoun

(10) Patent No.: US 6,227,299 B1
(45) Date of Patent: May 8, 2001

(54) FLAPPER VALVE WITH BIASING FLAPPER CLOSURE ASSEMBLY

(75) Inventor: Stuart M. Dennistoun, Carrollton, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/351,397

(22) Filed: Jul. 13, 1999

(51) Int. Cl.[7] ............................. E21B 34/06; F16K 21/04; F16K 1/16
(52) U.S. Cl. ..................... 166/332.8; 137/515; 137/527; 137/535; 251/298; 251/337
(58) Field of Search ................... 166/332.8, 321; 137/515, 515.5, 515.7, 527, 535, 536; 251/298, 337

(56) References Cited

U.S. PATENT DOCUMENTS

| | | | |
|---|---|---|---|
| 5,145,005 | 9/1992 | Dollison | 166/334 |
| 5,159,981 | 11/1992 | Le | 166/325 |
| 5,201,371 | * 4/1993 | Allen | 166/325 |
| 5,310,005 | * 5/1994 | Dollison | 166/334 |
| 6,050,294 | * 4/2000 | Makowan | 137/527 |

* cited by examiner

Primary Examiner—David Bagnell
Assistant Examiner—Jennifer R. Dougherty
(74) Attorney, Agent, or Firm—Paul I. Herman; Lawrence R. Youst

(57) ABSTRACT

A flapper valve assembly (110) having a biasing flapper closure assembly (102) is disclosed. The flapper valve assembly (110) comprises tubular valve housing (94) having a hinge (100) and a longitudinal hole (104). A valve seat (92) is mounted within the housing (94) having a flow passage therethrough. A flapper closure plate (86) is rotatably disposed within the housing (94) about the hinge (100). The flapper closure plate (86) is rotatable between a valve open position and a valve closed position. The flapper closure plate (86) has a notch (132) on the side opposite its sealing surface (114) that is spaced a distance (136) from the hinge (100). The flapper closure assembly (102) includes a spring (116) mounted within the longitudinal hole (104) and a connection member (122) operably coupled to the spring (116) and engaging the notch (132) such that when the flapper closure plate (86) is moved toward the open position, the spring (116) is compressed causing the connection member (122) to urge the flapper closure plate (86) toward the closed position.

15 Claims, 8 Drawing Sheets

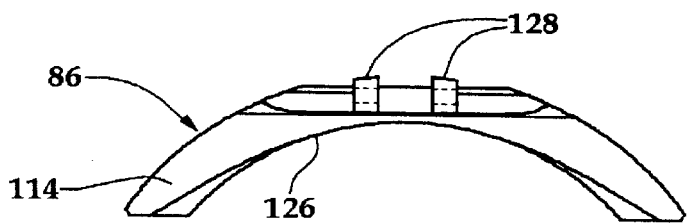
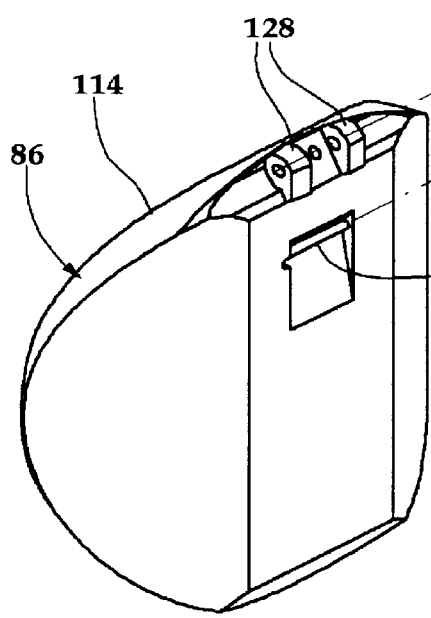
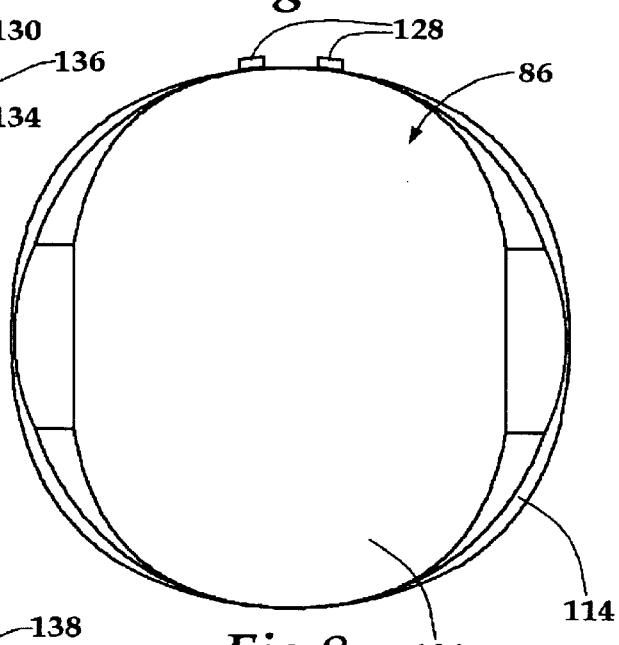
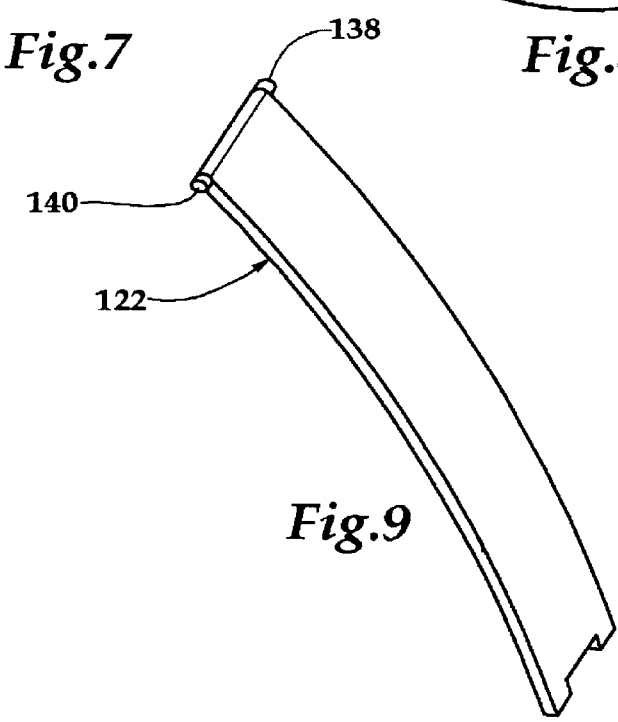

FLAPPER VALVE WITH BIASING FLAPPER CLOSURE ASSEMBLY

TECHNICAL FIELD OF THE INVENTION

This invention relates in general to flapper type valves and, in particular, to a flapper type valve that includes a flapper closure plate for controlling fluid flow therethrough that is biased into sealing engagement with the flapper seat by a flapper closure assembly that pushes on the back face of the flapper closure plate.

BACKGROUND OF THE INVENTION

Without limiting the scope of the invention, the background will describe surface controlled, subsurface safety valves, as an example.

Surface controlled, subsurface safety valves are commonly used to shut in oil and gas wells in the event of a failure or hazardous condition at the well surface. Such safety valves are typically fitted into the production tubing and operate to block the flow of formation fluid upwardly therethrough. The subsurface safety valve provides automatic shutoff of production flow in response to a variety of out of range safety conditions that can be sensed or indicated at the surface. For example, the safety conditions include a fire on the platform, a high or low flow line temperature or pressure condition or operator override.

During production, the subsurface safety valve is typically held open by the application of hydraulic fluid pressure conducted to the subsurface safety valve through an auxiliary control conduit which extends along the tubing string within the annulus between the tubing and the well casing. Flapper type subsurface safety valves utilize a closure plate which is actuated by longitudinal movement of a hydraulically actuated, tubular piston. The flapper valve closure plate is maintained in the valve open position by an operator tube which is extended by the application of hydraulic pressure onto the piston. A pump at the surface pressurizes a reservoir which delivers regulated hydraulic control pressure through the control conduit. Hydraulic fluid is pumped into a variable volume pressure chamber and acts against the crown of the piston. When, for example, the production fluid pressure rises above or falls below a preset level, the control pressure is relieved such that the piston and operator tube are retracted to the valve closed position by a return spring. The flapper plate is then rotated to the valve closed position by a torsion spring or tension member.

It has been found, however, that in tight safety valve applications having a large inner diameter and a small outer diameter, typical torsion spring or tension member designs provide insufficient bias or closure force to lift the flapper plate to the closed position. In the case of a torsion spring, the size and therefore the closure force of the torsion spring are limited by the space available to house the torsional spring. In the case of a tension member, closure force is limited by length of the lever arm between the hinge pin of the flapper plate and the location where in the tension member is attached to the linkage that extends from the hinge in the direction opposite of the flapper plate.

Therefore, a need has arisen for a flapper valve that has sufficient bias or closure force to lift the flapper plate into the closed position in tight applications. A need has also arisen for such a flapper valve the can produce the required closure force without increasing the space available for a spring within the flapper valve. A need has further arisen for such a flapper valve that can take advantage of a longer lever arm to exert a greater closure force to the flapper plate.

SUMMARY OF THE INVENTION

The present invention disclosed herein comprises a flapper valve assembly that has sufficient closure force to move the flapper closure plate to the closed position in tight applications. The flapper valve assembly disclosed herein produces the required closure force without the need for increasing the size of the spring within the flapper valve. The flapper valve assembly of the present invention utilizes a longer lever arm to exert an increased closure force to the flapper plate.

The flapper valve assembly of the present invention comprises a tubular valve housing having a hinge and a longitudinal hole. A valve seat is mounted within the housing. The valve seat has a valve seat sealing surface and defines a flow passage therethrough. A flapper closure plate is rotatable about the hinge between a valve open position and a valve closed position. In the valve open position, the flapper closure plate is removed from the valve seat. In the valve closed position the sealing surface of the flapper closure plate sealingly engages the valve seat sealing surface for preventing flow through the flow passage.

The flapper closure plate has a notch on the side opposite the sealing surface of the flapper closure plate that is spaced a distance from the pivot point of the hinge. A flapper closure assembly biases the flapper closure plate toward the closed position. The flapper closure assembly includes a spring that is mounted within the longitudinal hole and a connection member that is operably coupled to the spring and engages the notch such that when the flapper closure plate is moved toward the open position, the spring is compressed causing the connection member to urge the flapper closure plate toward the closed position. The distance between the notch and the hinge provides a moment arm sufficient for the flapper closure assembly to bias the flapper closure plate from the open position to the closed position which may be about 90 degrees.

The flapper closure assembly may include a piston member that is at least partially disposed within the hole. The piston member couples the spring to the connection member. The connection member may be rotatably coupled to the piston member and may be rotatably received within the notch of the flapper closure plate. The connection member may have an arcuate shape such that the connection member exerts a moment on the flapper closure plate when the flapper closure plate is in the open position.

In one embodiment of the present invention, the flapper valve assembly may be incorporated into a subsurface safety valve that is adapted to be placed in a well tubing string to control flow therethrough. The subsurface safety valve comprises a valve housing having a bore therethrough, a hinge and a longitudinal hole. A flapper closure plate is mounted within the bore and is rotatable about the hinge. The flapper closure plate is movable between an open position and a closed position. The flapper closure plate has a sealing surface on one side and a notch on the opposite side. An operator is movably disposed within the bore for controlling movement of the flapper closure plate from the closed position to the open position. A flapper closure assembly biases the flapper closure plate toward the closed position. The flapper closure assembly includes a spring mounted within the longitudinal hole and a connection member that is operably coupled to the spring and that engages the notch such that when the flapper closure plate is moved toward the open position, the spring is compressed causing the connection member to urge the flapper closure plate toward the closed position. A valve seat is disposed within the valve housing. The valve seat has a sealing surface such that when the subsurface safety valve is in the closed position, the sealing surface of the flapper closure plate sealingly engaging the sealing surface of the valve seat.

BRIEF DESCRIPTION OF THE DRAWINGS

For a more complete understanding of the present invention, including its features and advantages, reference is now made to the detailed description of the invention, taken in conjunction with the accompanying drawings of which:

FIG. 6 is a top view of a flapper closure plate of a flapper valve assembly of the present invention;

FIG. 7 is a perspective view of a flapper closure plate of a flapper valve assembly of the present invention;

FIG. 8 is a plan view of a flapper closure plate of a flapper valve assembly of the present invention;

FIG. 9 is a perspective view of a connection member of a flapper valve assembly of the present invention;

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
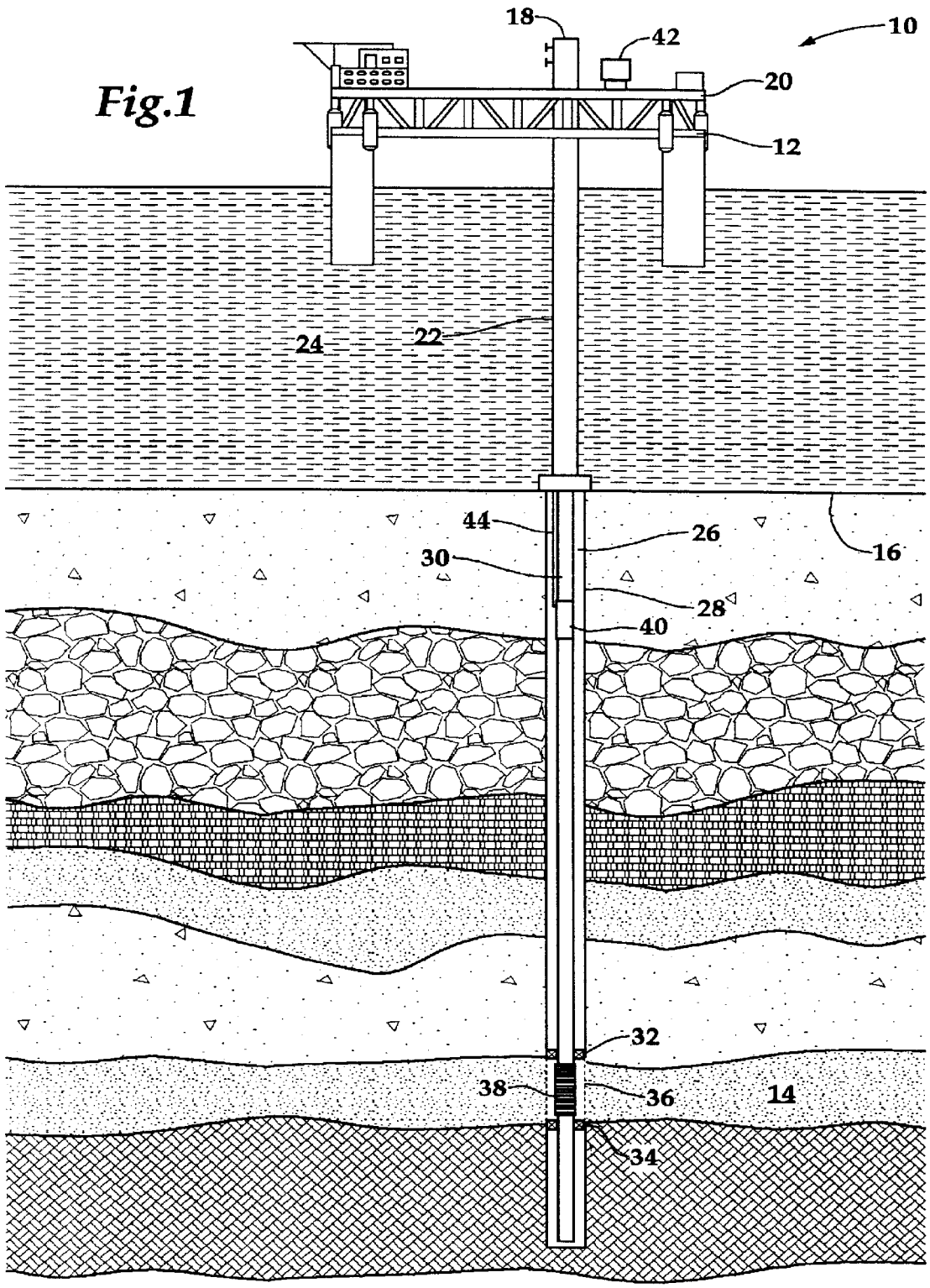
FIG. 1 is a schematic illustration of an offshore oil or gas production platform operating a subsurface safety valve of the present invention.

Referring to FIG. 1, a subsurface safety valve in use with an offshore oil and gas production platform is schematically illustrated and generally designated 10. A semi-submersible platform 12 is centered over a submerged oil and gas formation 14 located below sea floor 16. Wellhead 18 is located on deck 20 of platform 12. Well 22 extends through the sea 24 and penetrates the various earth strata including formation 14 to form wellbore 26. Disposed within wellbore 26 is casing 28. Disposed within casing 28 and extending from wellhead 18 is production tubing 30. A pair of seal assemblies 32, 34 provide a seal between tubing 30 and casing 28 to prevent the flow of production fluids therebetween. During production, formation fluids enter wellbore 26 through perforations 36 of casing 28 and travel into tubing 30 through sand control device 38 to wellhead 18. Subsurface safety valve 40 is located within the production tubing 30 and seals the wellhead 18 from formation 14 in the event of abnormal conditions. Subsurface safety valve 40 includes a flapper valve closure plate that, during production from formation 14, is maintained in the valve open position by hydraulic control pressure received from a surface control system 42 through a control conduit 44.

Referring now to FIGS. 2A, 2B, 3A and 3B, a subsurface safety valve 50 is illustrated. Safety valve 50 is connected directly in series with production tubing 30. Hydraulic control pressure is conducted in communication with a longitudinal bore 52 formed in the sidewall of the top connector sub 54. Pressurized hydraulic fluid is delivered through the longitudinal bore 52 into an annular chamber 56 defined by a counterbore 58 which is in communication with an annular undercut 60 formed in the sidewall of the top connector sub 54. An inner housing mandrel 62 is slidably coupled and sealed to the top connector sub 54 by a slip union 64 and seal 66, with the undercut 60 defining an annulus between inner mandrel 62 and the sidewall of top connector sub 54.

Figure 2A:
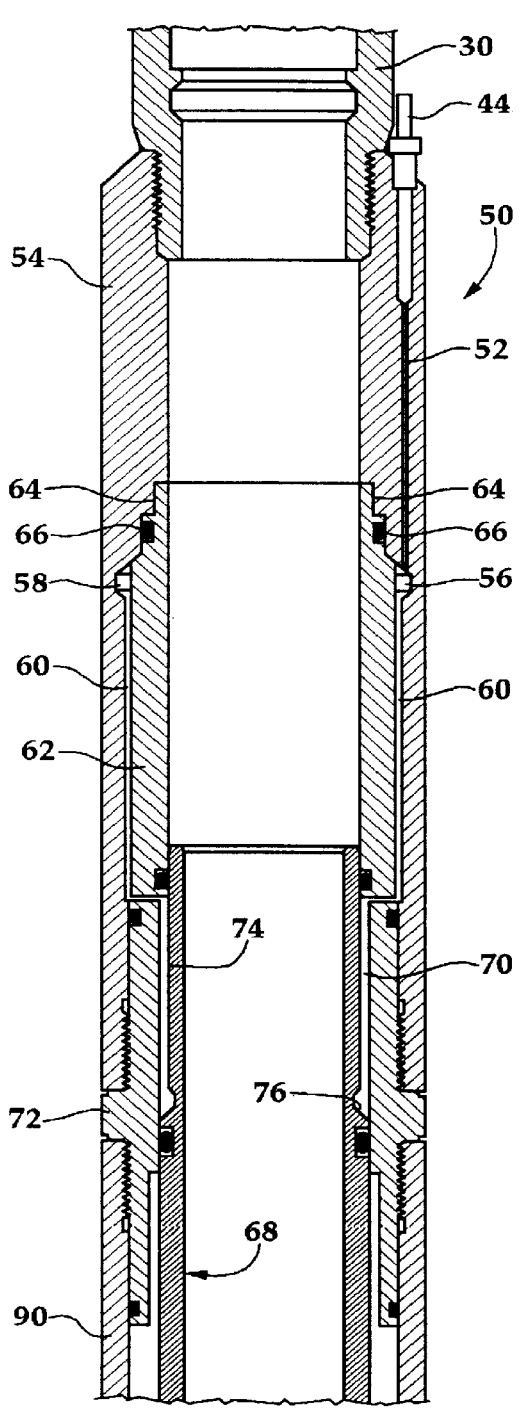
FIGS. 2A–2B are half sectional views of a subsurface safety valve of the present invention in the valve open position.
Figure 2B:
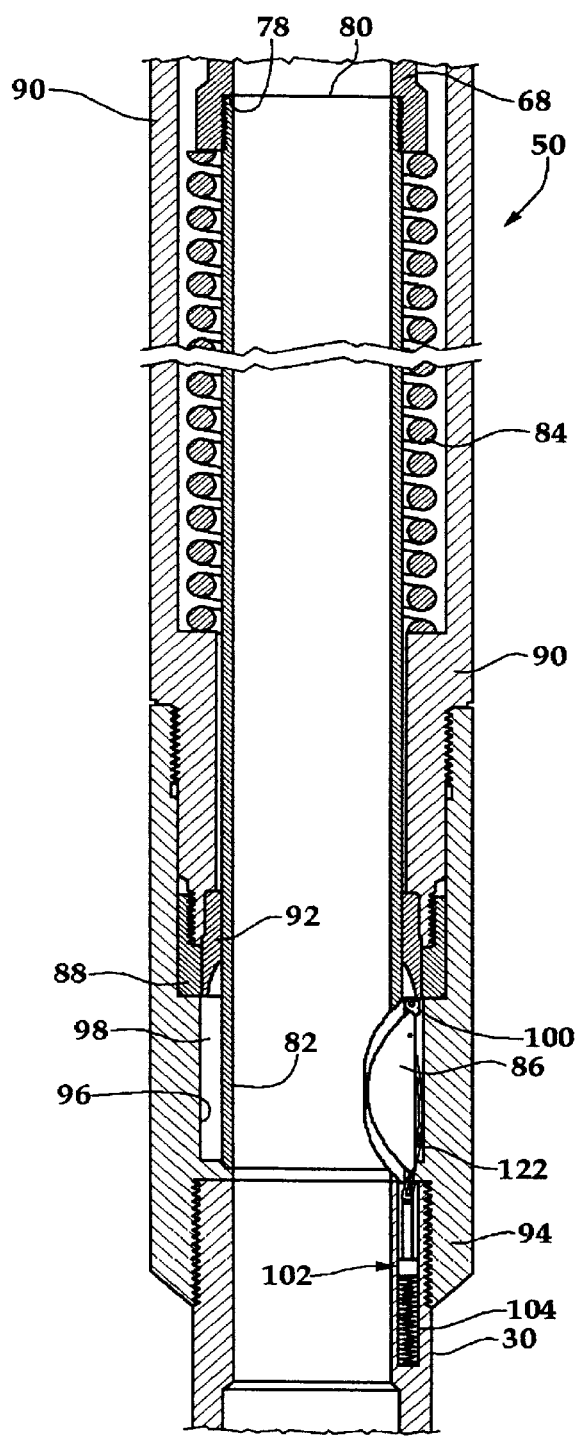

A piston 68 is received in slidable, sealed engagement against the internal bore of inner mandrel 62. The undercut annulus 60 opens into a piston chamber 70 in the annulus between the internal bore of a connector sub 72 and the external surface of piston 68. The external radius of an upper sidewall piston section 74 is machined and reduced to define a radial clearance between piston 68 and connector sub 72. An annular sloping surface 76 of piston 68 is acted against by the pressurized hydraulic fluid delivered through control conduit 44. In FIGS. 2A–2B, piston 68 is fully extended with the piston shoulder 78 engaging the top annular face 80 of an operator tube 82 such that a return spring 84 is fully compressed and valve 50 is in the valve open position.

Figure 3A:
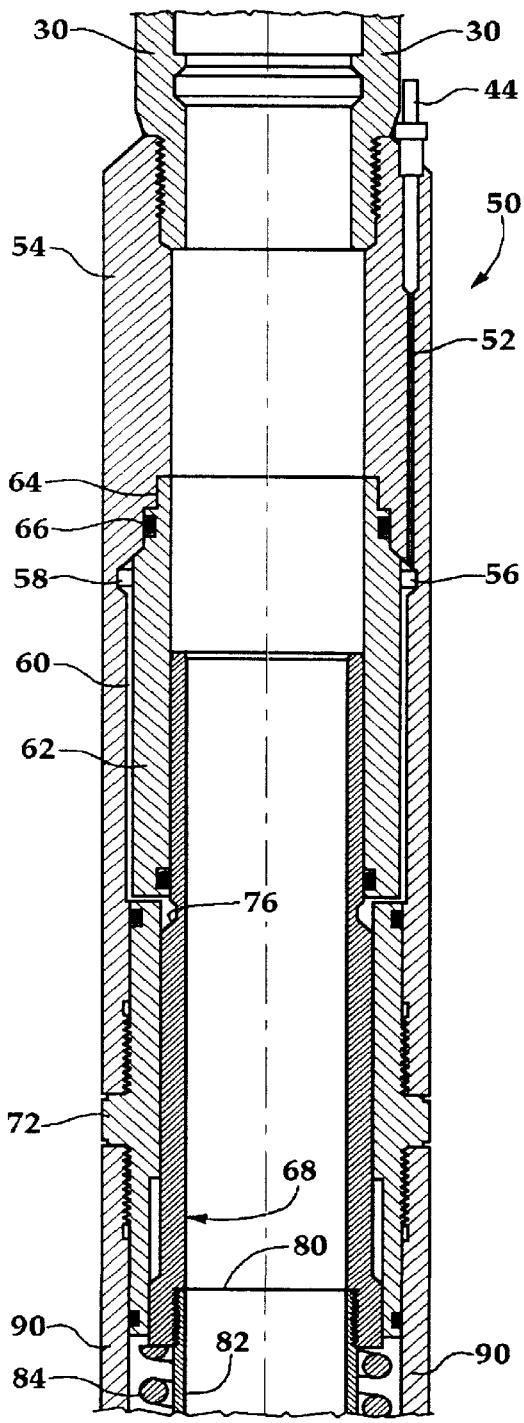
FIGS. 3A–3B are half sectional views of a subsurface safety valve of the present invention in the valve closed position.
Figure 3B:
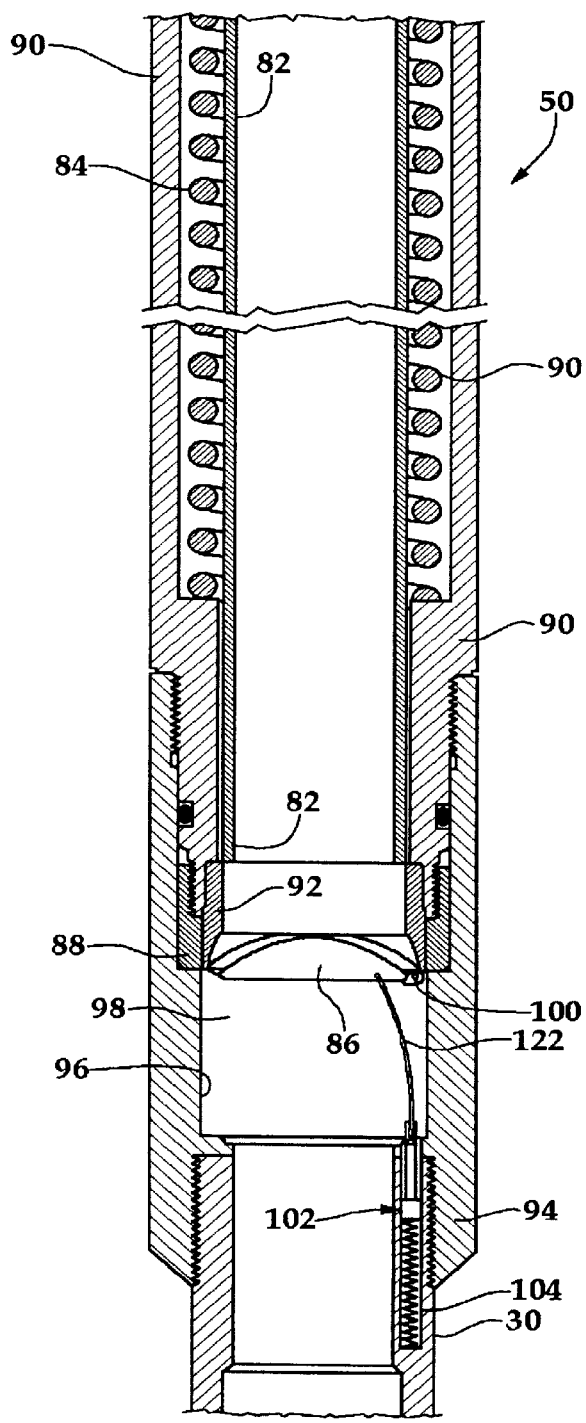

A flapper plate 86 is pivotally mounted onto a hinge sub 88 which is threadably connected to the lower end of spring housing 90. A valve seat 92 is confined within hinge sub 88. The lower end of safety valve 50 is connected to production tubing 30 by a bottom sub connector 94. The bottom sub connector 94 has a counterbore 96 which defines a flapper valve chamber 98. Thus, the bottom sub connector 94 forms a part of the flapper valve housing enclosure. Flapper plate 86 pivots on hinge 100 and is biased about 90 degrees to the valve closed position as shown in FIGS. 3A–3B by flapper valve closure assembly 102 housed partially within hole 104 in tubing 30. In the valve open position as shown in FIGS. 2A–2B, the bias force of flapper valve closure assembly 102 is overcome and flapper plate 86 is retained in the valve open position by operator tube 82 to permit formation fluid flow up through tubing 30.

When an out of range condition occurs and subsurface safety valve 50 must be operated from the valve open position to the valve closed position, hydraulic pressure is released from conduit 44 such that return spring 84 acts on the lower end of piston 68 which retracts operator tube 82 longitudinally through flapper valve chamber 98. Flapper closure plate 86 will then rotate about 90 degrees through chamber 98 in response to the bias force of flapper valve closure assembly 102.

Figure 4:
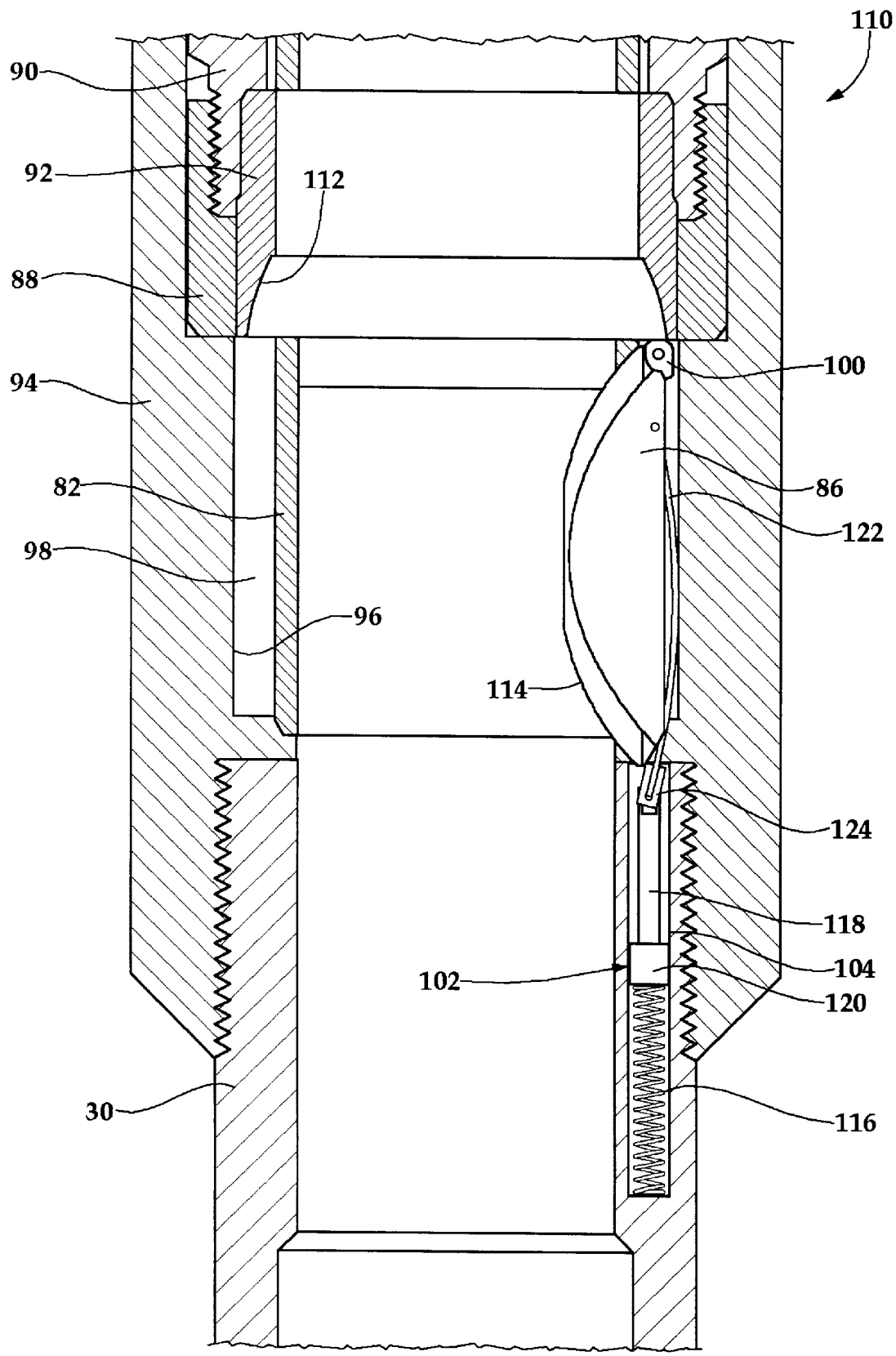
FIG. 4 is a half sectional view of a flapper valve assembly of the present invention in the valve open position.
Figure 5:
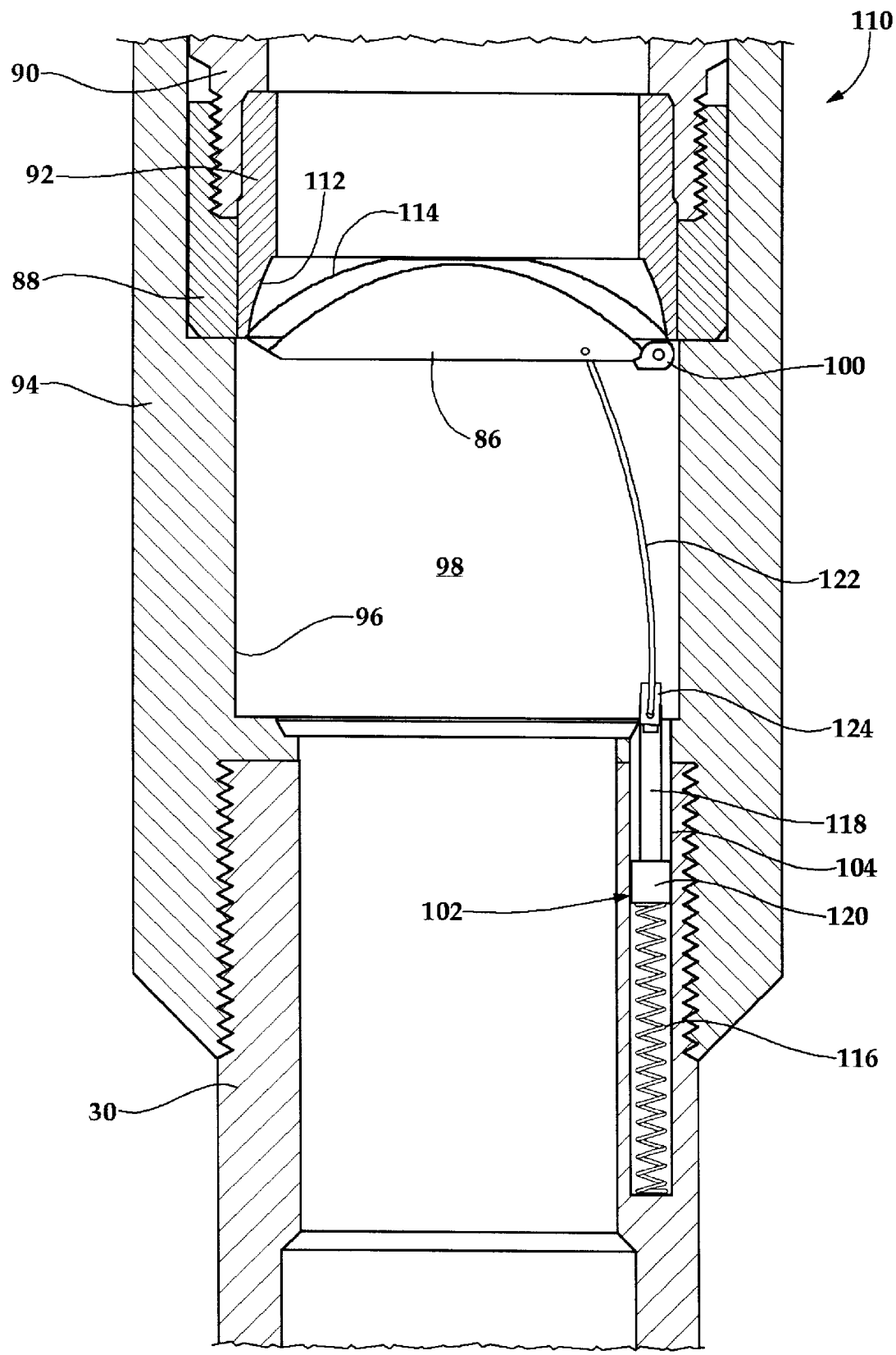
FIG. 5 is a half sectional view of a flapper valve assembly of the present invention in the valve closed position.

Referring now to FIGS. 4 and 5, a flapper valve assembly is depicted and generally designated 110. Flapper valve assembly 110 includes a flapper closure plate 86 that is bias to the closed position by flapper valve closure assembly 102. In the illustrated embodiment, the sealing surfaces of flapper closure plate 86 and valve seat 92 have mating spherical segments which are matched in curvature to provide a metal-to-metal seal. It has been found that the use of metal-to-metal contact between nesting spherical segments provides a continuous, positive seal that is maintained completely around the spherical segment interface. It should be understood by those skilled in the art, however, that other flapper closure plate and valve seat arrangements having other sealing surface configurations that are known in the art are equally well-suited for use in the present invention, these arrangements and configurations being contemplated and falling within the scope of the present invention.

Flapper valve closure assembly 102 includes one or more compression springs 116, only one of which is shown, that are disposed within longitudinal hole 104. Flapper valve closure assembly 102 also includes a piston 118 that has shoulder 120 which contacts compression spring 116 within longitudinal hole 104. A connection member 122 is coupled to piston 118 on the end opposite spring 116 with coupling 124. In the illustrated embodiment, connection member 122 is rotatably coupled to piston 118. On the end opposite coupling 124, connection member 122 engages flapper closure plate 86 as will be more fully discussed below.

When flapper valve assembly 110 is operated from the close position as depicted in FIG. 5 to the open position as depicted in FIG. 4, operator tube 82 is extended downwardly through valve chamber 98 rotating flapper closure plate 86 about 90 degrees. As flapper closure plate 86 rotates, compression spring 116 is compressed due to the downward movement of connection member 122 and piston 118 thereby biasing flapper closure plate 86 toward the closed position. As flapper closure plate 86 nears its fully open position, connection member 122 contacts counterbore 96 of flapper valve chamber 98. As such, connection member 122 acts like a leaf spring and further biases flapper closure plate 86 toward the closed position. This result is achieved due to the arcuate shape of connection member 122 which assures that a moment will be applied about hinge 100 even when flapper closure plate 86 is in the fully opened position.

Referring next to FIGS. 6–8, therein is depicted various views of flapper closure plate 86. Flapper closure plate 86 has a arcuate shaped face 126 which receives operator tube 82 when flapper closure plate 86 is operated from the closed position to the open position. Flapper closure plate 86 also includes a pair of hinge members 128 through which a pin is inserted along axis 130 to couple hinge members 128 of flapper closure plate 86 with hinge 100. Flapper closure plate 86 includes a notch 132. Notch 132 has an axis of rotation 134 located therein. The distance 136 between axis 130 and axis 134 defines the length of the moment arm used to bias flapper closure plate 86 from the open position to the closed position. Distance 136 may be adjusted as necessary depending upon the size and weight of flapper closure plate 86.

Referring now to FIGS. 7 and 9, connection member 122 is inserted into notch 132 of flapper closure plate 86. Connection member 122 includes a pair of pins 138, 140 that are received within notch 132 and assure that connection member 122 does not become separated from flapper closure plate 86 during operation. As explained above, connection member 132 has an arcuate shape which allows connection member 122 to act as a leaf spring and bias flapper closure plate 86 toward the closed position when flapper closure plate 86 is in its fully open position.

Figure 10:
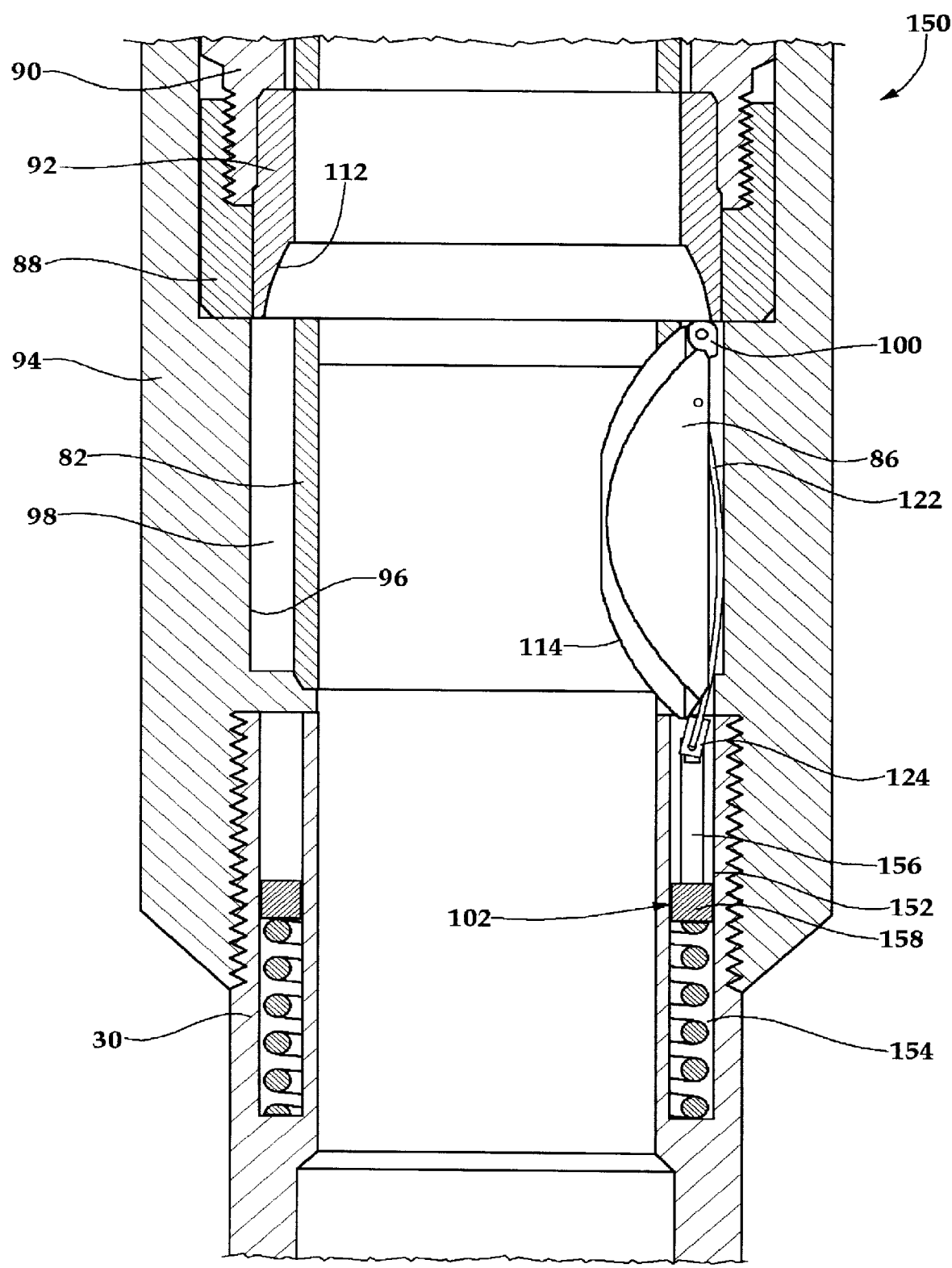
FIG. 10 is a half sectional view of a flapper valve assembly of the present invention in the valve open position.
Figure 11:
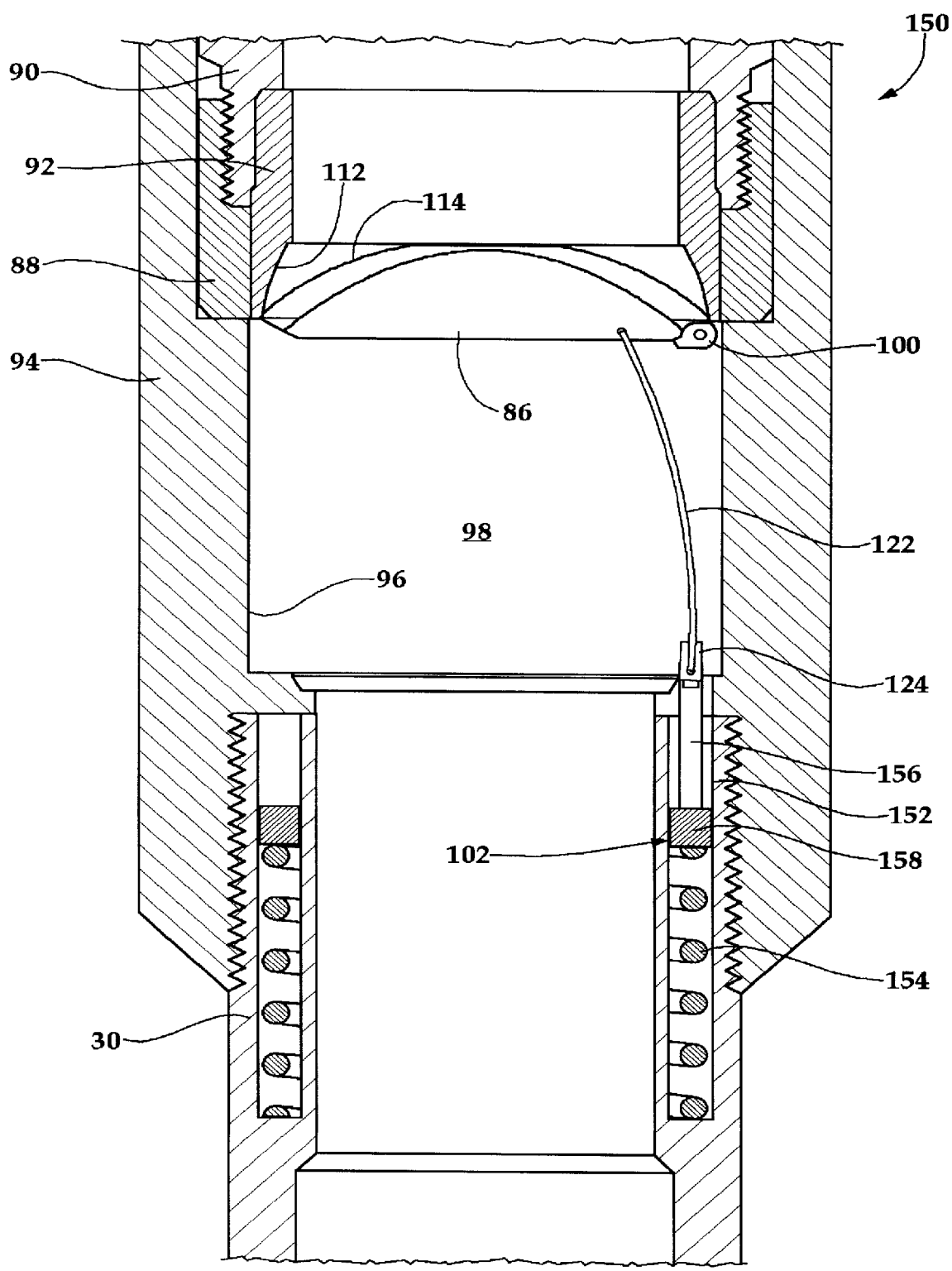
FIG. 11 is a half sectional view of a flapper valve assembly of the present invention in the valve closed position.

Referring now to FIGS. 10 and 11, a flapper valve assembly is depicted and generally designated 150. Flapper valve assembly 150 includes a flapper closure plate 86 that is bias to the closed position by flapper valve closure assembly 102. Flapper valve closure assembly 102 includes a compression spring 154 that is disposed within annular hole 152. Flapper valve closure assembly 102 also includes a piston 156 that has sleeve 158 which contacts compression spring 154 within annular hole 152. A connection member 122 is coupled to piston 156 on the end opposite spring 154 with coupling 124. In the illustrated embodiment, connection member 122 is rotatably coupled to piston 156. On the end opposite coupling 124, connection member 122 engages flapper closure plate 86 as described above.

When flapper valve assembly 150 is operated from the close position as depicted in FIG. 11 to the open position as depicted in FIG. 10, operator tube 82 is extended downwardly through valve chamber 98 rotating flapper closure plate 86 about 90 degrees. As flapper closure plate 86 rotates, compression spring 154 is compressed due to the downward movement of connection member 122 and piston 156 thereby biasing flapper closure plate 86 toward the closed position. As flapper closure plate 86 nears its fully open position, connection member 122 contacts counterbore 96 of flapper valve chamber 98. As such, connection member 122 acts like a leaf spring and further biases flapper closure plate 86 toward the closed position. This result is achieved due to the arcuate shape of connection member 122 which assures that a moment will be applied about hinge 100 even when flapper closure plate 86 is in the fully opened position.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A flapper valve assembly comprising:
   a tubular valve housing having a hinge and a hole;
   a valve seat mounted within the housing having a valve seat sealing surface, the valve seat defining a flow passage therethrough;
   a flapper closure plate rotatably coupled to the hinge and rotatable between a valve open position in which the flapper closure plate is removed from the valve seat and a valve closed position in which a sealing surface of the flapper closure plate sealingly engages the valve seat sealing surface for preventing flow through the flow passage; and
   a flapper closure assembly biasing the flapper closure plate toward the closed position, the flapper closure assembly including a spring mounted within the hole and a connection member operably coupling the spring to the flapper closure plate, the spring being compressed when the flapper closure plate is moved toward the open position causing the connection member to urge the flapper closure plate toward the closed position, the connection member having a arcuate shape such that the connection member exerts a moment on the flapper closure plate when the flapper closure plate is in the open position.

2. The flapper valve assembly as recited in claim 1 wherein the connection member is rotatably received within a notch in the flapper closure plate.

3. The flapper valve assembly as recited in claim 1 wherein the flapper valve closure assembly further comprises a piston member at least partially disposed within the hole, the piston member coupling the spring to the connection member.

4. The flapper valve assembly as recited in claim 3 wherein the connection member is rotatably coupled to the piston member.

5. The flapper valve assembly as recited in claim 1 wherein the flapper closure plate travels about 90 degrees between the closed position and the open position.

6. The flapper valve assembly as recited in claim 1 wherein the distance between the connection member on the flapper closure plate and the hinge provides a moment arm sufficient for the flapper closure assembly to bias the flapper closure plate from the open position to the closed position.

7. A subsurface safety valve adapted to be placed in a well tubing string to control flow therethrough comprising:

a valve housing having a bore therethrough, a hinge and a longitudinal hole;

a flapper closure plate mounted within the bore and rotatable about the hinge, the flapper closure plate movable between an open position and a closed position, the flapper closure plate having a sealing surface on one side and a notch on the opposite side;

an operator movably disposed within the bore for controlling movement of the flapper closure plate from the closed position to the open position;

a flapper closure assembly biasing the flapper closure plate toward the closed position, the flapper closure assembly including a spring mounted within the longitudinal hole and a connection member operably coupled to the spring and engaging the notch, the spring being compressed when the flapper closure plate is moved toward the open position causing the connection member to urge the flapper closure plate toward the closed position, the connection member having a arcuate shape such that the connection member exerts a moment on the flapper closure plate when the flapper closure plate is in the open position; and a valve seat disposed within the valve housing, the valve seat having a sealing surface, in the closed position, the sealing surface of the flapper closure plate sealingly engaging the sealing surface of the valve seat.

8. The subsurface safety valve as recited in claim 7 wherein the connection member is rotatably received within the notch of the flapper closure plate.

9. The subsurface safety valve as recited in claim 7 wherein the flapper valve closure assembly further comprises a piston member at least partially disposed within the hole, the piston member coupling the spring to the connection member.

10. The subsurface safety valve as recited in claim 9 wherein the connection member is rotatably coupled to the piston member.

11. The subsurface safety valve as recited in claim 7 wherein the flapper closure plate travels about 90 degrees between the closed position and the open position.

12. The flapper valve assembly as recited in claim 7 wherein the distance between the notch and the hinge provides a moment arm sufficient for the flapper closure assembly to bias the flapper closure plate from the open position to the closed position.

13. A flapper valve assembly comprising:

a tubular valve housing having a hinge and a longitudinal hole;

a valve seat mounted within the housing having a valve seat sealing surface, the valve seat defining a flow passage therethrough;

a flapper closure plate rotatably coupled to the hinge and rotatable between an open position and a closed position, the flapper closure plate having a valve seat sealing surface on one side and a notch on the opposite side that is spaced a distance from the hinge; and a flapper closure assembly biasing the flapper closure plate toward the closed position, the flapper closure assembly including a spring mounted within the longitudinal hole, a piston at least partially disposed with the longitudinal hole and operably coupled to the spring and a connection member rotatably coupled to the piston and rotatably engaging the notch, the spring being compressed when the flapper closure plate is moved toward the open position causing the connection member to urge the flapper closure plate toward the closed position, the connection member having a arcuate shape such that the connection member exerts a moment on the flapper closure plate when the flapper closure plate is in the open position.

14. The flapper valve assembly as recited in claim 13 wherein the flapper closure plate travels about 90 degrees between the closed position and the open position.

15. The flapper valve assembly as recited in claim 13 wherein the distance between the notch and the hinge provides a moment arm sufficient for the flapper closure assembly to bias the flapper closure plate from the open position to the closed position.

* * * * *